US012412722B2

(12) United States Patent
Medina et al.

(10) Patent No.: US 12,412,722 B2
(45) Date of Patent: Sep. 9, 2025

(54) POWER FUSE WITH ZINC-ALUMINUM ALLOY TERMINALS AND METHODS OF FABRICATION

(71) Applicant: Eaton Intelligent Power Limited, Dublin (IE)

(72) Inventors: Archibaldo Montes Medina, Juarez Chihuahua (MX); Robert Stephen Douglass, Wildwood, MO (US); Frederick Eugene Still, Jr., El Paso, TX (US); Iwona Langowska, Tczew (PL)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/420,660

(22) Filed: Jan. 23, 2024

(65) Prior Publication Data

US 2024/0170243 A1 May 23, 2024

Related U.S. Application Data

(63) Continuation of application No. PCT/IB2021/056664, filed on Jul. 23, 2021.

(51) Int. Cl.
*H01H 69/02* (2006.01)
*H01H 85/045* (2006.01)
(Continued)

(52) U.S. Cl.
CPC .......... *H01H 85/153* (2013.01); *H01H 69/02* (2013.01); *H01H 85/0456* (2013.01); *H01H 85/143* (2013.01)

(58) Field of Classification Search
CPC ......... H01H 85/143–157; H01H 69/02; H01H 85/045–0458
See application file for complete search history.

(56) References Cited

U.S. PATENT DOCUMENTS

| | | | | | |
|---|---|---|---|---|---|
| 2,782,286 | A * | 2/1957 | Detch | H01H 85/0458 | 337/248 |
| 4,972,170 | A * | 11/1990 | Ehlmann | H01H 85/1755 | 337/248 |

(Continued)

FOREIGN PATENT DOCUMENTS

WO WO 2021050607 A1 3/2021

OTHER PUBLICATIONS

International Search Report and Written Opinion for International Application No. PCT/IB2021/056664, 10 pages, Apr. 29, 2022.

(Continued)

*Primary Examiner* — Jacob R Crum
(74) *Attorney, Agent, or Firm* — Baker Botts L.L.P.

(57) ABSTRACT

A power fuse with zinc-aluminum terminals is provided. The power fuse includes a housing having a first end and a second end. Coupled to the housing at the first end is a first terminal assembly fabricated from a zinc-aluminum alloy, and coupled to the housing at the second end is a second terminal assembly also fabricated from the zinc-aluminum alloy. The first and second terminal assemblies include a copper plating entirely covering an exterior of the zinc-aluminum alloy. A fuse element assembly is positioned inside the housing and is electrically connected between the first terminal assembly and the second terminal assembly.

21 Claims, 8 Drawing Sheets

(51) Int. Cl.
*H01H 85/143* (2006.01)
*H01H 85/153* (2006.01)

(56) References Cited

U.S. PATENT DOCUMENTS

| | | | | |
|---|---|---|---|---|
| 7,515,031 | B2 * | 4/2009 | Jakobsen | H01H 85/143 337/248 |
| 10,325,746 | B2 | 6/2019 | Schlaak | |
| 10,553,387 | B1 | 2/2020 | Angelini | |
| 10,650,998 | B2 | 5/2020 | Douglass | |
| 10,978,267 | B2 | 4/2021 | Douglass | |
| 2008/0191832 | A1 * | 8/2008 | Tsai | H01H 69/022 29/623 |
| 2010/0194519 | A1 | 8/2010 | Harris | |
| 2015/0348732 | A1 | 12/2015 | Douglass | |

OTHER PUBLICATIONS

2 Pcs, Grounding Bushing w/Split Collar, Die Cast Zinc, 1-1/4 In., Zamak 3 Providing Excellent Corrosion Protection, Amazon. Available at https://www.amazon.com/Grounding-Providing-Excellent-CorrosionProtection/dp/B0798M2K4W, downloaded on Jan. 25, 2024, 4 pages.

* cited by examiner

POWER FUSE WITH ZINC-ALUMINUM ALLOY TERMINALS AND METHODS OF FABRICATION

PRIORITY

This application is a continuation under 35 U.S.C. § 365(c) of International Patent Application No. PCT/IB2021/056664, filed 23 Jul. 2021, which is incorporated herein by reference.

TECHNICAL FIELD

This disclosure relates generally to electrical circuit protection fuses, and more specifically to power fuses including terminal assemblies fabricated from zinc-aluminum alloys and related fabrication methods.

BACKGROUND

Fuses are widely used as overcurrent protection devices to prevent costly damage to electrical circuits. Fuse terminals typically form an electrical connection between an electrical power source or power supply and an electrical component or a combination of components arranged in an electrical circuit. One or more fusible links or elements, or a fuse element assembly, is connected between the fuse terminals, such that when electrical current flowing through the fuse exceeds a predetermined limit, the fusible elements melt and open one or more circuits through the fuse to prevent electrical component damage. Because fuses are high-volume electrical components, even an incremental cost reduction in manufacture of fuses, without sacrificing performance, has great value. Improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DESCRIPTION OF EXAMPLE EMBODIMENTS

Figure 1A:
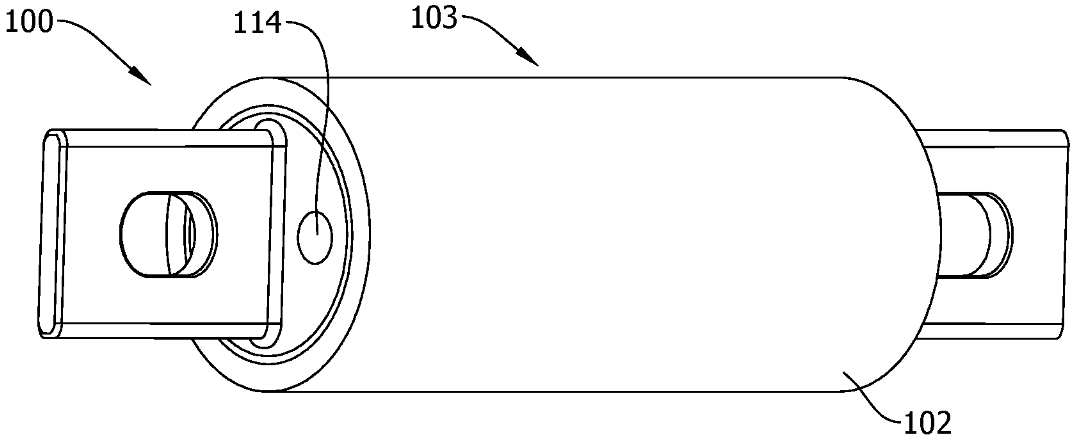
FIG. 1A is a perspective view of an exemplary power fuse.

Overcurrent protection fuses are one type of widely-used circuit protectors for isolating and protecting load-side circuitry and loads from problematic current flow in the line-side circuitry in an electrical power system. Conductive components of many fuses are typically fabricated from copper or copper alloy due to their superior electrical properties relative to other known conductive materials. Efforts to reduce manufacturing costs of fuses, without affecting fuse performance and reliability, have imposed great challenges to fuse manufacturers to meet the demands of the marketplace. Coupled with more recent efforts to provide higher power handling capability in reduced package sizes of fuses for certain applications, including but not limited to electric vehicle (EV) applications operating at high voltage and current levels, the challenges to fuse manufacturers are multiplied.

Silver, brass and other metals and metal alloys are available and have been used to some extent in the construction of fuses, but with tradeoffs due to differences in the electrical properties of such alternatives to the electrical properties of copper and copper alloys, so additional materials are now being explored that may avoid some of the tradeoffs and/or that will meet the rigorous demands of high current, high voltage applications from both performance and reliability perspectives. Many such alternative materials are known, but for various reasons have not been considered a viable alternative to copper or copper alloy by those in the art for certain end use applications. Among these is zinc-aluminum alloy.

Although zinc-aluminum alloy is cheaper than copper alloy, zinc-aluminum alloy has not been used in known terminal assemblies of fuses, and there is some reluctance to even try this for good reason. Zinc-aluminum alloy is susceptible to oxidation and corrosion, including galvanic corrosion, when used as a conductor. Such corrosion tends to be more severe as the voltage of the power system increases, raising general reliability concerns as zinc-aluminum alloy is relatively more prone to failure than copper or copper alloy. Further, corroded terminals of a fuse pose higher risk than corroded fusible elements or other conductive elements which are safely contained inside a housing of the fuse. When fuse terminals become corroded, their electrical resistance increases, possible to the point of electrical contact failure, dramatically increasing the operating temperature of the fuse terminals outside of or exterior to the fuse housing. This is of particular concern when the heat generated via the higher resistance relating to corrosion reaches the melting point of a zinc-aluminum alloy.

Compared to copper or copper alloy which has a melting temperature of approximately 1000° C., the melting temperature of zinc-aluminum alloy is approximately 500° C. That is, corroded zinc-aluminum alloy terminals may be melted from the heat generated by electricity flowing through a corroded terminal assembly. Melted metal terminals may result in electrical arcing at a location outside of the fuse housing and present fire hazards and other safety concerns in the vicinity of an affected fuse. Such concerns are multiplied if electrical arcing were to jump to different phase conductors near an affected fuse, possibly resulting in short-circuit conditions and a severe arc flash event that occurs exterior to the fuse housing. Of course, the higher the voltage and current happen to be, the more energy that is available as potential arc energy, therefore presenting substantial obstacles to be resolved in any considered attempt to adopt zinc-aluminum alloy in the fabrication of fuse terminals.

The fuse terminals are not protected in the same way as interior components of the fuse are, so the impediments to the use of zinc-aluminum alloy as internal fuse conductors are substantially lower. The terminals are exterior to or outside of the housing, such that corrosive elements can reach the terminal assembly much more easily than the interior components in the first instance. If the internal fuse conductors corrode to the point of failure, excessive heat generation and arcing can be expected to be safely contained in the interior of the fuse housing, which is typically filled with an arc extinguishing medium. As such, when internal fuse conductors fail due to corrosive effects or other material-related properties, the fuse opens prematurely, perhaps as a nuisance to electrical power system administrators, but fire hazards and safety hazards are not presented. Likewise, if internal fuse conductors overheat, they do so within the housing and within the arc extinguishing medium that collectively mitigate any effect on the outside of the fuse from a fire hazard or safety hazard perspective.

In contrast, when exterior conductors such as the terminal elements become negatively impacted, the effects are realized at locations exterior to the fuse housing. Thermal runaway conditions attributed to a corroded terminal present fire hazards because they occur on the outside of the fuse, while in comparison a thermal runaway condition inside the fuse does not. Likewise, arcing inside the fuse can be contained in a well-designed fuse, while arcing outside the fuse raises completely different issues.

Apart from the significant concerns described above, zinc-aluminum alloy generally has inferior electrical properties to copper and copper alloys. Specifically, zinc-aluminum alloy has a lower electrical conductivity and higher resistance in use, which is especially concerning for higher current, higher voltage applications. In combination with the safety and reliability concerns described above, metal alloys such as a zinc-aluminum have either not been seriously considered at all or have been considered and discarded for use in exterior conductors in fuses such as the fuse terminals.

Inventive fuses and terminal assemblies disclosed herein, contrary to longstanding beliefs in the art, overcome the limitations of zinc-aluminum alloy while ensuring the circuit protection, performance, safety, and reliability are not compromised, thereby achieving desired cost reduction with desired reliability, safety and performance in power fuses. Lower cost components such as terminal assemblies including terminals and end bells fabricated from zinc-aluminum alloy are used to reduce amounts of traditional copper or copper alloy in the manufacture of a power fuse. Zinc-aluminum alloy is selected by having comparable electrical conductivity to a metal such as brass that has been safely and successfully used to fabricate conventional fuse terminals. The zinc-aluminum terminal assemblies are plated with copper to increase electrical conductivity as well as reduce corrosion of the terminal assembly and render them satisfactory for use in higher current, higher voltage applications. The fabrication process for the inventive fuse terminals is also simplified relative to known fabrication of fuse terminal assemblies. Specifically, the inventive terminal assemblies disclosed herein are fabricated by die-casting, without requiring additional machining and manufacturing steps conventionally needed to form filler holes and/or grooves in terminal assemblies to make connections to internal fuse conductors such as fusible elements.

The zinc-aluminum alloy terminal assemblies of power fuses and fabrication methods meet longstanding and unfulfilled needs in the art for lower cost fuses by strategically choosing zinc-aluminum alloy based on the desired performance and functionality and designing terminal assemblies to overcome the performance differences and limitations of zinc-aluminum alloy from copper or copper alloy. In the contemplated embodiments, the inventive zinc-aluminum alloy fuses significantly reduce the costs over conventional fuses with terminal assemblies fabricated from copper or copper alloy while reliably delivering high performance in a desired package size for safe operation in demanding applications such as EV power systems and other high current, high voltage systems that are beyond the capability of conventional fuse designs.

Figure 1B:
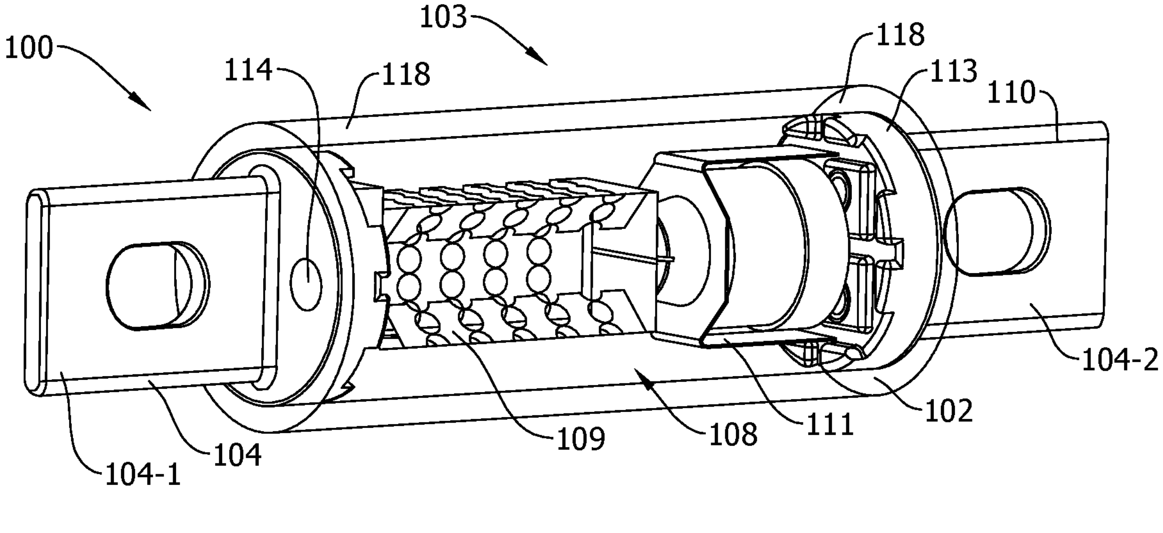
FIG. 1B is a perspective view of the power fuse shown in FIG. 1A with the housing of the power fuse depicted as being transparent for the purpose of illustrating interior components of the power fuse.

FIGS. 1A and 1B show an exemplary embodiment of a power fuse 100. FIG. 1A is a schematic diagram of a perspective view of the power fuse 100. FIG. 1B is a schematic diagram of the power fuse 100 with a housing 102 of the power fuse 100 depicted as being transparent for the purpose of illustrating interior of the fuse body 103.

In the exemplary embodiment, the power fuse 100 includes the fuse body 103 and terminal assemblies 104. The power fuse 100 includes two terminal assemblies 104, a first terminal assembly 104-1 and a second terminal assembly 104-2. The terminal assemblies 104-1, 104-2 may be the same or different from one another. The fuse body 103 includes the housing 102 and a fuse element assembly 108. The fuse element assembly 108 is positioned inside the housing 102. In some embodiments, the fuse element assembly 108 includes one or more fusible links or a fuse element extending through the fuse body 103 between terminal assemblies 104-1, 104-2. In the illustrated embodiment, the fuse element assembly 108 includes a short circuit portion 109 and a time delay portion 111, although it is appreciated that other fuse elements, fusible links, fusible strips and the like may likewise be employed separately or in combination in further and/or alternative embodiments of the disclosure.

In the exemplary embodiment, the terminal assembly 104 includes a terminal 110 and an end bell 112. The terminal 110 is configured to connect the power fuse 100 to a line- or load-side circuitry. The terminal 110, sometimes referred to as a blade or a knife blade, extends outwardly from the end bell 112. The end bell 112 is received in an end 113 of the fuse body 103. The electrical connection of the fuse element assembly 108 is completed through the end bells 112 and the terminals 110 such that when electrical current flowing through the power fuse 100 exceeds a predetermined limit, fusible elements of the fuse element assembly 108 melt, disintegrate, or otherwise structurally fail and open the circuit path through the power fuse 100 to prevent electrical component damage. The load-side circuitry is therefore electrically isolated from the line-side circuitry to protect load-side circuit components from damage when electrical fault conditions occur.

In the exemplary embodiment, the terminal assembly 104 may further include a filler hole 114 in the end bell 112. The end bell 112 may include one or a plurality of filler holes 114. In some embodiment, one of the end bells 112 has filler holes 114 while the other end bell 112 does not have filler holes 114. The filler hole 114 is sealed with a plug (not shown). The plug may be fabricated from steel, plastic, or other materials in various embodiments. In other embodiments, a filler hole 114 or filler holes 114 may be provided at other locations, including but not limited to the housing 102, to facilitate the introduction of the arc extinguishing filler.

In the exemplary embodiment, the terminal assemblies 104 are coupled to the housing 102 at ends 118 of the housing 102. The terminal assemblies 104 may be coupled to the housing 102 through pins (not shown) that hold the terminal assemblies 104 with the housing 102 such that the terminal assemblies 104 withstand pressure generated inside the housing and stay in place with the housing 102 after repeated temperature and pressure changes caused by current or by arcing during short circuit and/or overcurrent events.

The power fuse 100 may further include an arc extinguishing filler (not shown). The arc extinguishing filler may be included inside the housing 102 through the filler hole 114. The arc extinguishing filler surrounds at least part of the fuse element assembly 108 and is configured to block or mitigate arcing. The arc extinguishing filler may be fabricated from quartz silica sand and a sodium silicate binder. The quartz sand has a relatively high heat conduction and absorption capacity in its loose compacted state, but can be silicated to provide improved performance. For example, a liquid sodium silicate solution is added to the sand and then the free water is dried off.

Figure 2A:
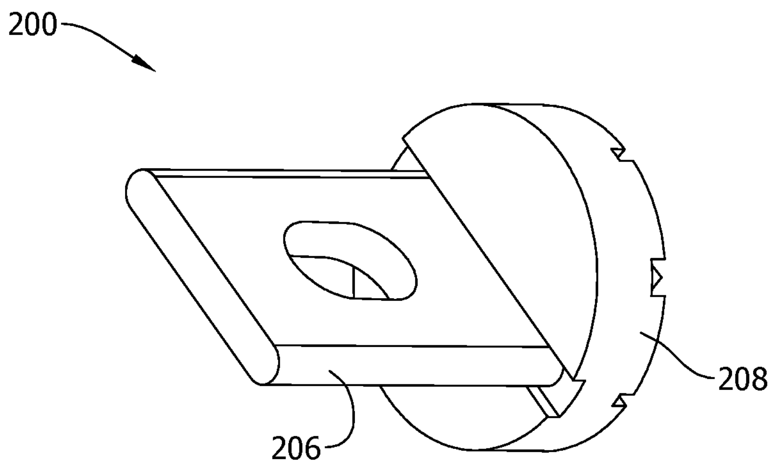
FIG. 2A (PRIOR ART)
FIG. 2A is a front perspective view of a known terminal assembly of a power fuse.
Figure 2B:
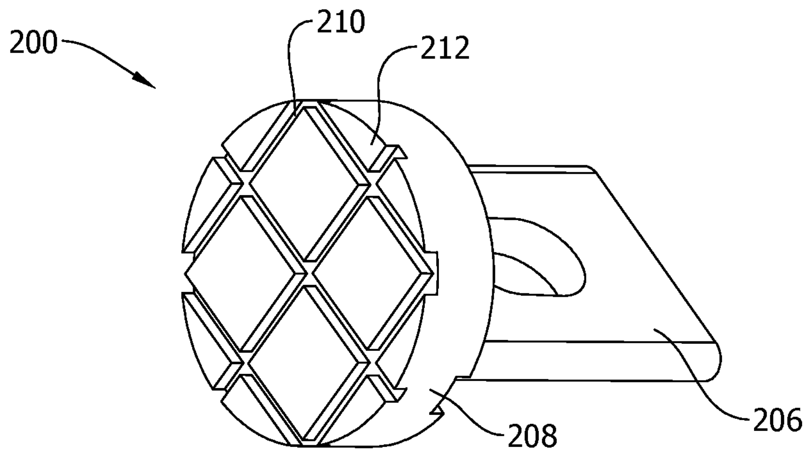
FIG. 2B (PRIOR ART)
FIG. 2B is a rear perspective view of the terminal assembly shown in FIG. 2A.
Figure 2C:
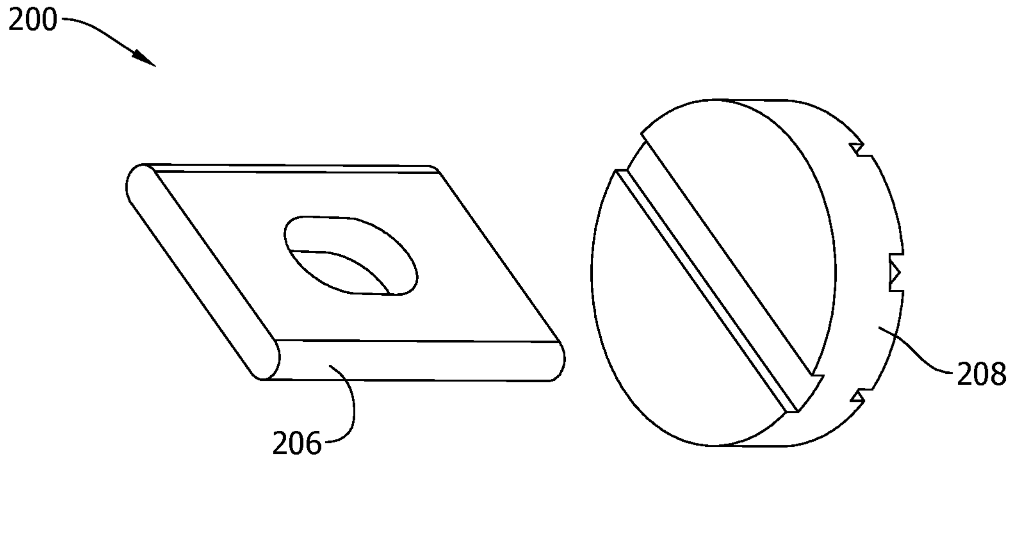
FIG. 2C (PRIOR ART)
FIG. 2C shows the terminal assembly shown in FIG. 2A before being assembled.
Figure 2D:
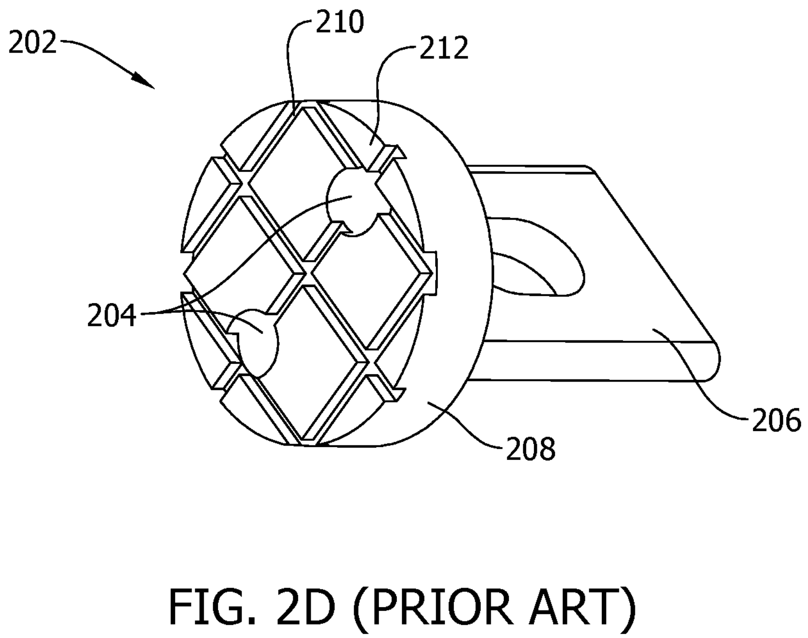
FIG. 2D (PRIOR ART)
FIG. 2D is a rear perspective view of another known terminal assembly of a power fuse.

FIGS. 2A-2D show known terminal assemblies 200, 202. FIG. 2A is a front perspective view of the terminal assembly 200. FIG. 2B is a rear perspective view of the terminal assembly 200. FIG. 2C is a front perspective view of the terminal assembly 200 before being assembled. FIG. 2D is a rear perspective view of the known terminal assembly 202. Compared to the known terminal assembly 200, the known terminal assembly 202 includes filler holes 204. The terminal assemblies 200, 202 are fabricated from copper or copper alloy such as brass. The terminal assembly 200, 202 includes a terminal 206 and an end bell 208. The terminal assemblies 200, 202 may be fabricated as a single piece, where the terminal 206 and the end bell 208 are fabricated as one piece. The terminal assemblies 200, 202 may be fabricated as two pieces, where the terminal 206 and the end bell 208 are fabricated as separate pieces and then are assembled together. The two pieces are typically brazed together via brazing alloy such as silver solder. The terminal 206 and the end bell 208 may be fabricated from different material, for example, the terminal 206 is fabricated from copper and the end bell 208 is fabricated from brass. The terminal assemblies 200, 202 may further include grooves 210 at a side 212 of the end bell 208 opposite the terminal 206. The groove 210 is used to couple a fuse element to the end bell 208.

Because of the relatively-high melting temperature of copper or copper alloy, the terminal assemblies 200, 202 are manufactured by forging or sand casting, and machined afterwards to finalize precise features and dimensions such as the grooves 210 and the filler holes 204.

Figure 3A:
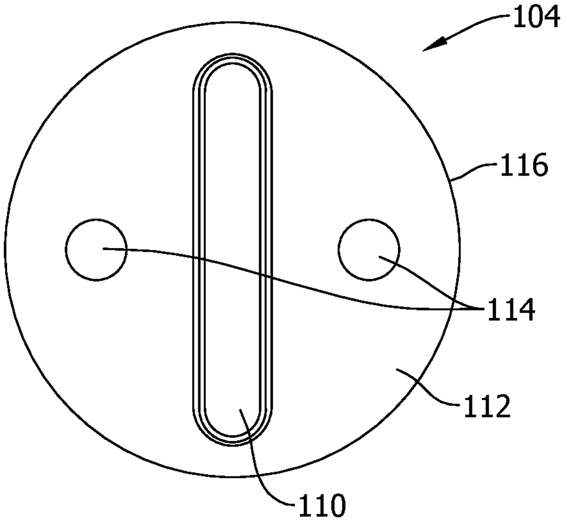
FIG. 3A is a top view of an exemplary terminal assembly of the power fuse shown in FIG. 1A.
Figure 3B:
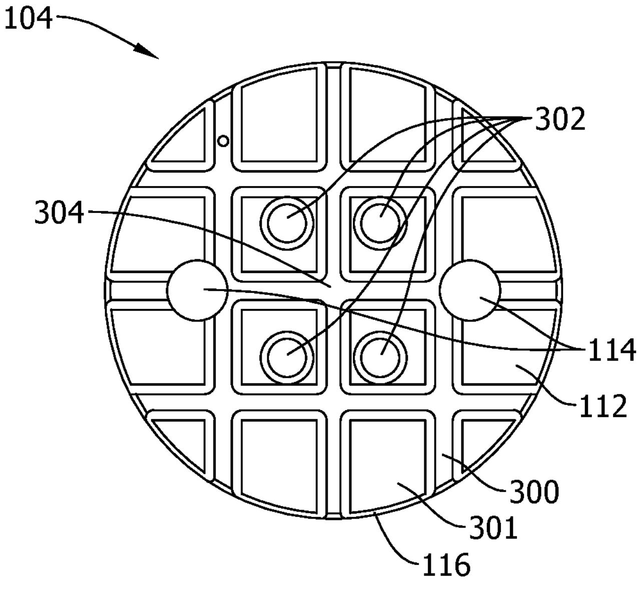
FIG. 3B is a bottom view of the terminal assembly shown in FIG. 3A.
Figure 3C:
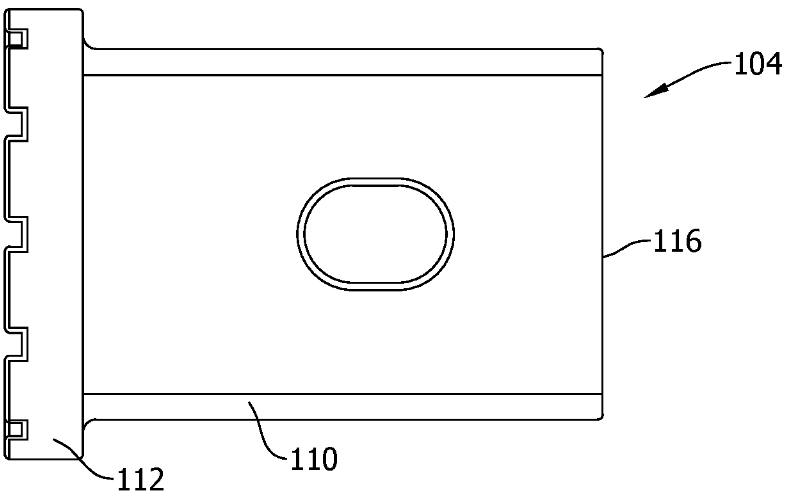
FIG. 3C is a side view of the terminal assembly shown in FIG. 3A.
Figure 3D:
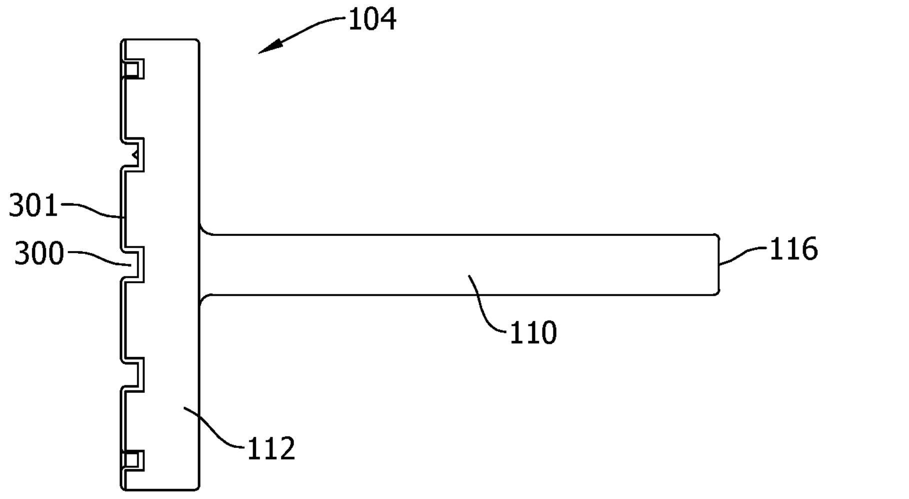
FIG. 3D is another side view of the terminal assembly shown in FIG. 3A, where the terminal assembly is rotated by approximately 90° about a longitudinal axis from the position shown in FIG. 3C.
Figure 3E:
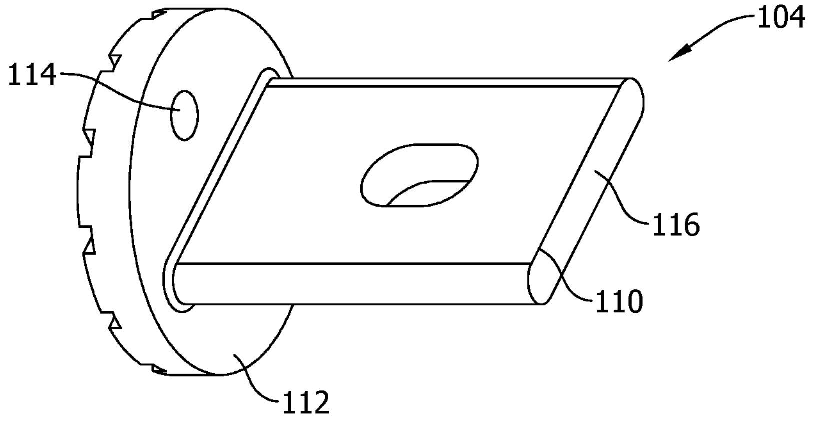
FIG. 3E is a front perspective view of the terminal assembly shown in FIG. 3A.
Figure 3F:
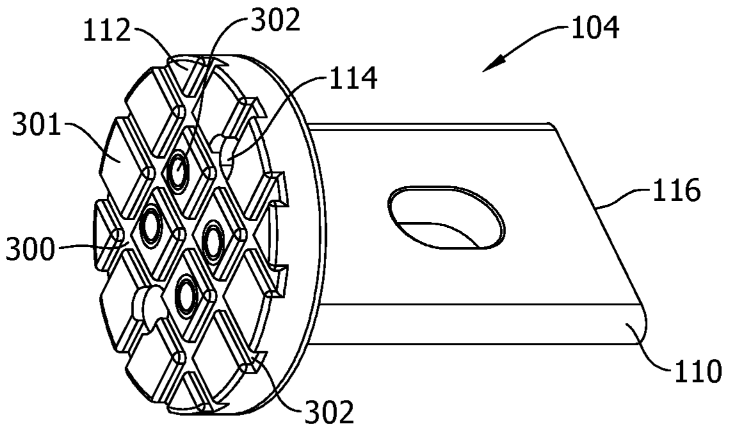
FIG. 3F is a rear perspective view of the terminal assembly shown in FIG. 3A.

Referring now to FIGS. 3A-3F, the terminal assemblies 104 are fabricated from a zinc-aluminum alloy. FIGS. 3A-3F are a top view (FIG. 3A), a bottom view (FIG. 3B), side views (FIGS. 3C and 3D), a top perspective view (FIG. 3E), and a bottom perspective view (FIG. 3F) of the terminal assembly 104. The terminal assembly 104 shown in FIG. 3D is rotated approximately 90° about a longitudinal axis of the terminal assembly 104 from the position shown in FIG. 3C.

In the exemplary embodiment, the terminal assembly 104 may include the filler hole 114. The filler hole 114 may be positioned in the end bell 112. The terminal assembly 104 may include a groove 300 or a plurality of grooves 300. The groove 300 is positioned at a side 301 of the end bell 112 opposite the terminal 110. The terminal assemblies 104 at either end 113 of the fuse body 103 (FIG. 1B) may be the same or may be different from one another by having variations in features. For example, either the first terminal assembly 104-1 or the second terminal assembly 104-2 has filler holes, or the terminal assemblies 104 have the same or different numbers of filler holes 114. In another example, in the illustrated embodiment shown in FIGS. 1A and 1B, the first terminal assembly 104-1 has grooves 300 for accommodating fuse links in the short circuit portion 109, and the second terminal assembly 104-2 has grooves 300 in a different pattern for coupling to the time delay portion 111. Alternatively, the terminal assemblies 104 have the same number and patterns of grooves 300, such as in a pattern of "H." Fuse links of one end of the fuse element assembly 108 are coupled to the end bell 112 of the first terminal assembly 104-1 at the plurality of grooves 300, i.e., the vertical lines, in the "H" pattern. Fuse links of the other end of the fuse element assembly 108 are coupled to the end bell 112 of the second terminal assembly 104-2 at the single groove 300, i.e., the horizontal line, in the "H" pattern.

In the exemplary embodiment, the terminal assembly 104 further includes a plurality of terminal injection gates 302. The terminal injection gates 302 are positioned apart from one another. The terminal assemblies 104 are manufactured by pressure die casting, where molten metal is pushed or injected into a die cavity through corresponding injection gates in the die. The terminal assembly 104 start forming at the terminal injection gates 302. Because the molten metal solidifies while being injected into the die cavity, a plurality of injection gates increase the speed of filling the die cavity, thereby increasing the manufacturing speed as well as filling up the entirety of the die cavity such that the dimension and pattern of the terminal assembly 104 is manufactured as designed. The terminal injection gates 302 may be positioned symmetrical to one another with respect to the center 304 of the end bell 112.

In the exemplary embodiment, the terminal assembly 104 is fabricated as one single piece (i.e., only one piece). In other words, the terminal assembly 104 is integrally formed with all of the features shown and described above. For example, the terminal assembly 104 is fabricated with the terminal 110 and the end bell 112 formed as one unitary piece, and no assembling of the terminal 110 with the end bell 112 is needed, unlike the known terminal assembly 200, where assembling such as brazing is needed to join the terminal 206 with the end bell 208. Further, filler holes 114 and/or grooves 300 are also formed during the fabrication of the unitary part for the terminal assembly 104, and additional machining is not needed to produce filler holes 114 and/or grooves 300 in the terminal assembly 104.

Table 1 lists compositions and mechanical properties of copper or copper alloys for the known terminal assembly 200, 202.

TABLE 1

| | Alloy | | | | | |
|---|---|---|---|---|---|---|
| | C11000 ETP Copper | C21000 Gilding Metal | C23000 Red Brass | C26000 Cartridge Brass | C36000 Leaded Brass | Unit |
| Material Composition | | | | | | |
| Zn | Trace | 5 | 15 | 30 | 35.5 | % by Weight (Wt) |
| Al | Trace | Trace | Trace | Trace | Trace | % by Wt |
| Mg | Trace | Trace | Trace | Trace | Trace | % by Wt |
| Cu | 99.9 | Balance | Balance | Balance | Balance | % by Wt |
| Fe | Trace | 0.05 max | 0.05 max | 0.05 max | 0.35 max | % by Wt |
| Pb | Trace | 0.05 max | 0.05 max | 0.05 max | 3 | % by Wt |
| Cd | Trace | Trace | Trace | Trace | Trace | % by Wt |
| Sn | Trace | Trace | Trace | Trace | Trace | % by Wt |
| Ni | Trace | Trace | Trace | Trace | Trace | % by Wt |
| Mechanical Properties | | | | | | |
| Density | 8.89 | 8.86 | 8.75 | 8.53 | 8.5 | g/cm$^3$ |
| Electrical Conductivity | 101 | 56 | 37 | 28 | 26 | % IACS |
| Thermal Conductivity | 388 | 234 | 159 | 120 | 115 | W/m · ° K. (20° C.) |
| Thermal expansion coefficient | 17 | 18 | 18.7 | 19.9 | 20.5 | um/m · ° C. |
| Specific heat capacity | 0.385 | 0.38 | 0.38 | 0.375 | 0.38 | J/g · ° C. |
| Tensile Strength | 37.7 | 37.7 | 50 | 58 | 55.8 | ksi |
| Yield Strength | 29.7 | 31.9 | 39.2 | 45.7 | 45 | Ksi |
| Modulus of Elasticity | 130 | 115 | 115 | 110 | 97 | Gpa |
| Melt Temperature | 1065-1083 | 1050-1065 | 990-1025 | 915-955 | 885-900 | ° C. |

IACS stands for international annealed copper standard. Table 2 lists compositions and mechanical properties of exemplary zinc-aluminum alloys for the terminal assembly 104.

TABLE 2

| | Alloy | | | | | | | |
|---|---|---|---|---|---|---|---|---|
| | Zamak-2 | Zamak-3 | Zamak-5 | Zamak-7 | ZA-8 | ZA-12 | ZA-27 | Unit |
| Material Composition | | | | | | | | |
| Zn | Balance | Balance | Balance | Balance | Balance | Balance | Balance | % by Wt |
| Al | 3.9 to 4.3 | 3.9 to 4.3 | 3.9 to 4.3 | 3.9 to 4.3 | 8.2 to 8.8 | 10.8 to 11.5 | 25.5 to 28 | % by Wt |
| Mg | 0.025 to 0.05 | 0.03 to 0.06 | 0.03 to 0.06 | 0.01 to 0.02 | 0.02 to 0.03 | 0.02 to 0.03 | 0.012 to 0.02 | % by Wt |
| Cu | 2.7 to 3.3 | 0.10 max | 0.7 to 1.1 | 0.10 max | 0.9 to 1.3 | 0.5 to 1.2 | 2.0 to 2.5 | % by Wt |
| Fe | 0.35 max | 0.35 max | 0.35 max | 0.35 max | 0.35 max | 0.05 max | 0.07 max | % by Wt |
| Pb | 0.004 max | 0.004 max | 0.004 max | 0.003 max | 0.005 max | 0.005 max | 0.005 max | % by Wt |
| Cd | 0.003 max | 0.003 max | 0.003 max | 0.002 max | 0.005 max | 0.005 max | 0.005 max | % by Wt |
| Sn | 0.0015 max | 0.0015 max | 0.0015 max | 0.001 max | 0.002 max | 0.002 max | 0.002 max | % by Wt |
| Ni | Trace | Trace | Trace | 0.005 to 0.02 | Trace | Trace | Trace | % by Wt |
| Mechanical Properties | | | | | | | | |
| Density | 6.6 | 6.6 | 6.6 | 6.6 | 6.3 | 5 | 6 | g/cm$^3$ |
| Electrical Conductivity | 25 | 27 | 26 | 27 | 27.7 | 28.3 | 29.7 | % IACS |

TABLE 2-continued

| | Alloy | | | | | | | |
|---|---|---|---|---|---|---|---|---|
| | Zamak-2 | Zamak-3 | Zamak-5 | Zamak-7 | ZA-8 | ZA-12 | ZA-27 | Unit |
| Thermal Conductivity | 104.7 | 113 | 108 | 113 | 114.7 | 116.1 | 125.5 | W/m · ° K. (20° C.) |
| Thermal expansion coefficient | 27.8 | 27.4 | 27.4 | 27.4 | 23.3 | 24.2 | 26 | um/m · ° C. |
| Specific heat capacity | 0.419 | 0.419 | 0.419 | 0.419 | 0.435 | 0.448 | 0.534 | J/g · ° C. |
| Tensile Strength | 52 | 41 | 48 | 41 | 54 | 58 | 61 | ksi |
| Yield Strength | 41 | 32 | 39 | 32 | 42 | 46 | 55 | Ksi |
| Modulus of Elasticity | 85.5 | 85.5 | 85.5 | 85.5 | 85.5 | 82.7 | 77.9 | Gpa |
| Melt Temperature | 379-390 | 381-387 | 380-386 | 381-387 | 375-404 | 377-432 | 376-484 | ° C. |

Table 3 is a table summarizing the compositions and properties between exemplary zinc-aluminum alloys for the terminal assemblies 104 listed in Table 2 and copper or copper alloys for the known terminal assemblies 200, 202 listed in Table 1.

TABLE 3

| | Alloy | | |
|---|---|---|---|
| | Zinc-Aluminum Alloy Range of Properties | Copper/Copper-Alloy Range of Properties | Unit |
| Material Composition | | | |
| Zn | Balance | Trace to 37 | % by Wt |
| Al | 3.5 to 30 | Trace to 8 | % by Wt |
| Mg | 0.01 to 0.30 | Trace | % by Wt |
| Cu | 0.01 to 3.0 | Balance | % by Wt |
| Fe | 0.03 to 0.08 | Trace | % by Wt |
| Pb | 0.003 to 0.006 | Trace to 3 | % by Wt |
| Cd | 0.003 to 0.006 | Trace | % by Wt |
| Sn | 0.0010 to 0.0035 | Trace to 10 | % by Wt |
| Ni | 0.02 max | Trace | % by Wt |
| Mechanical Properties | | | |
| Density | 5.00 to 6.65 | 8.48 to 8.95 | g/cm$^3$ |
| Electrical Conductivity | 25 to 30 | 26 to 101 | % IACS |
| Thermal Conductivity | 104 to 126 | 114 to 389 | W/m · ° K. (20° C.) |
| Thermal expansion coefficient | 23 to 28 | 16 to 19 | μm/m · ° C. |
| Specific heat capacity | 0.415 to 0.540 | 0.370 to 0.390 | J/g · ° C. |
| Tensile Strength | 40 to 62 | 37 to 58.5 | ksi |
| Yield Strength | 31 to 56 | 29 to 46 | Ksi |
| Modulus of Elasticity | 77.5 to 85.7 | 96 to 131 | Gpa |
| Melt Temperature | 375-484 | 885-1083 | ° C. |

The zinc-aluminum alloys listed in Table 2 have comparable electrical, thermal, and mechanical properties to copper and copper alloys such as brass alloys listed in Table 1. In the exemplary embodiment, the terminal assembly 104 is fabricated from zinc-aluminum alloy that is referred to as zamak alloy, e.g., zamak-2, zamak 3, zamak-5, and zamak-8, and includes zinc, aluminum, magnesium, and copper, where aluminum is approximately 4% by weight or mass and zinc is approximately 95% by weight or mass. The terminal assembly 104 may be fabricated from zinc-aluminum alloy such as ZA-8, ZA-12, or ZA-27. In choosing types of zinc-aluminum alloy to fabricate the terminal assembly 104, the chosen zinc-aluminum alloy has comparable electrical conductivity to brass in a contemplated example.

Zinc-aluminum alloy is cheaper than copper or copper alloy such as brass. For example, compared to the known terminal assembly 202 fabricated from brass, the cost of the terminal assembly 104, including the cost of raw material, manufacturing, and plating, is approximately half of the cost of the known terminal assembly 202. Further, zinc-aluminum alloy is approximately 23% lighter than copper or copper alloy and is therefore desirable in applications where weight is a concern such as in an EV power system. In addition, zinc-aluminum alloy has comparable electrical conductivity as brass. Although zinc-aluminum alloy has to some extent been used in elements inside the fuse housing such as fusible elements or used in other current carrying applications such as grounding, as understood zinc-aluminum alloy has not been used in known terminal assemblies of fuses, especially power fuses, where the voltage ratings are in the ranges of hundreds of volts and current ratings are in the ranges of hundreds of amperes. The reasons why are described in detail above.

In the exemplary embodiments, to maintain the safety and reliability of the power fuses 100 and the terminal assemblies 104, the zinc-aluminum terminal assemblies 104 are plated with copper, which reduces corrosion and also increases electrical conductivity of the terminal assemblies 104 for better performance in a power system. In other words, the terminal assembly 104 further includes a copper plating 116. The copper plating 116 surrounds entirely the zinc-aluminum alloy. That is, the copper plating 116 covers entirely the exterior of the zinc-aluminum alloy. The copper plating 116 both protects the zinc-aluminum from oxidation and corrosion and mitigates the otherwise inferior and undesirable electrical properties of zinc-aluminum alone (e.g., relatively poor electrical conductivity and increased resistance that become of greater concern as the operating current and voltage of the power system is increased).

In contemplated embodiments, the terminal assembly 104 may be used in a power fuse 100 having a voltage rating of 120 V (direct current (DC) or alternate current (AC)) or greater and/or a current rating up to 600 A (DC or AC). The terminal assembly 104 may be used in fuses of Underwriter Laboratory (UL) classes of J, R, H, LL, L, or T. Tests have been performed to verify that the performance, reliability, and safety of the power fuse 100 is not compromised. Compared to the known copper/copper alloy terminal assembly 200, 202, the cost of the components in the terminal assembly 104 is reduced by approximately 50% and the terminal assembly 104 has reduced part weight and final product weight and increased part strength.

The known terminal assembly 200, 202 is manufactured by forging, stamping, or sand-casing first to define a rough shape of the terminal assembly 200, 202 or its individual pieces such as the terminal 206 and the end bell 208 (FIG. 2C). Multiple pieces in the known terminal assembly 200 are brazed together. The terminal assembly 200, 202 is then machined to finalize precise features and dimensions and produce structures such as grooves 210 and/or filler holes 204. The terminal assembly 200, 202 may be plated.

In contrast, fabricating 400 the terminal assembly 104 is simplified and has reduced fabrication cost, and the time for the fabrication process is shortened. The terminal assembly 104 is casted in one piece, thereby eliminating high temperature brazing operation and post cleaning operation. In addition, grooves 300 and filler holes 204 are produced during casting. i.e., additional machining is not needed in fabricating 400 the terminal assembly 104, thereby lowering tooling cost. Tooling cost may be further reduced by eliminating stamping tools and fixtures. Further, zinc-aluminum alloy allows for higher part accuracy over copper and copper alloy. Moreover, because the melting temperature of zinc-aluminum alloy is lower than copper or copper alloy, the tooling cost of casting is lowered from the lowered casting temperature and lowered casting pressure.

Figure 4:
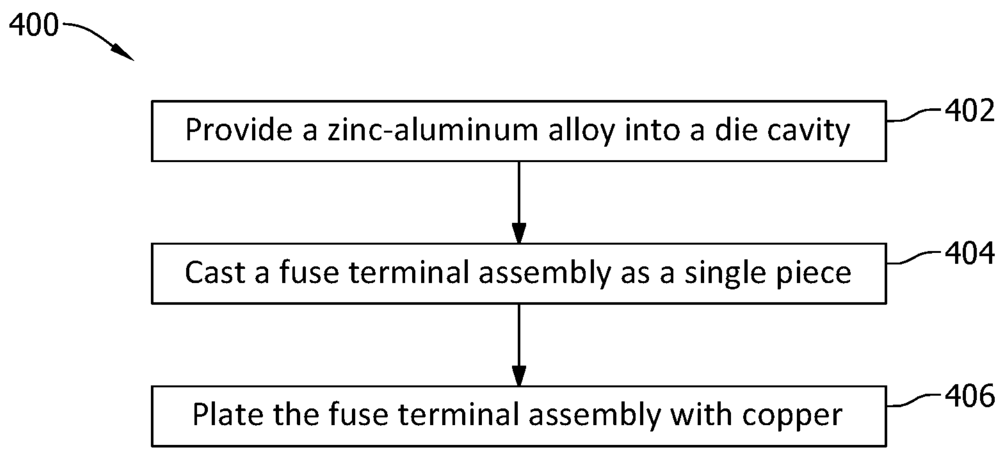
FIG. 4 is a flow chart of an exemplary method of fabricating terminal assemblies shown in FIGS. 1A, 1B, and 3A-3F.

FIG. 4 is a flow chart of the exemplary method 400 of fabricating the terminal assemblies 104 described herein. The method 400 includes providing 402 a zinc-aluminum alloy into a die cavity. The die cavity is defined by a mold of the terminal assembly 104. The method 400 further includes casting 404 a terminal assembly as a single piece from the zinc-aluminum alloy. The method 400 also includes plating 406 the terminal assembly with copper.

Figure 5:
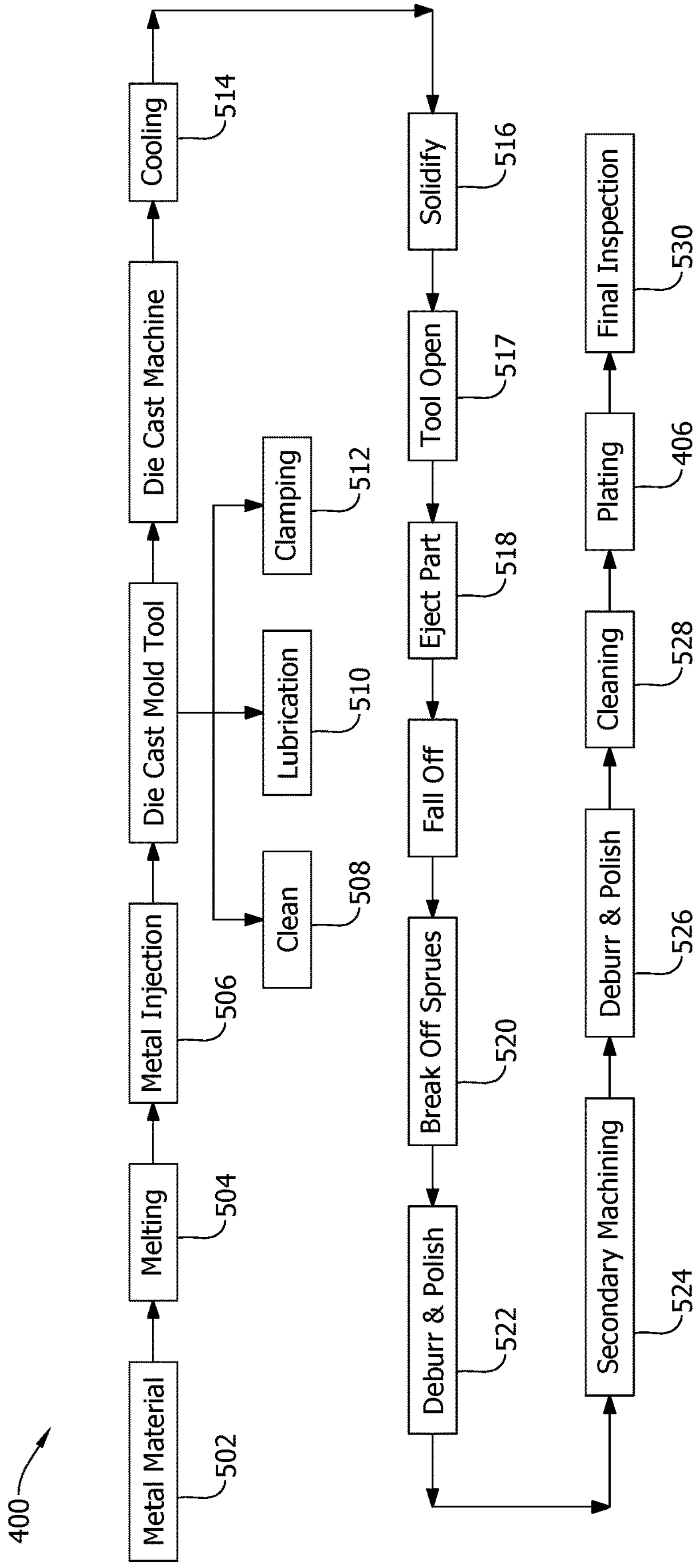
FIG. 5 is a flow chart of an embodiment of the method shown in FIG. 4.

FIG. 5 is a flow chart of an embodiment of the method 400. Metal material such as zinc-aluminum alloy described herein is provided 502. The metal is melted 504. The melted metal is injected or forced 506 into a die cast cavity defined by a die cast mold or die cast mold tool. The die cast mold may be cleaned 508, lubricated 510, and clamped 512 together to define the die cast cavity before the melted metal is forced 506 into the die cast cavity. The metal is cooled 514 and solidified 516 inside the die cast mold after being forced into the die cast cavity. The mold is then opened 517 and the molded part is ejected 518 and removed from the die cast machine. The molded part is processed such as breaking 520 off left-over sprues on the molded part and deburring and polishing 522 the molded part. The part may undergo 524 secondary machining and may be deburred and polished 526 again and cleaned 528 after having undergone secondary machining 524. The parts are plated 406 with copper. The die-casted parts are inspected 530 to meet dimensions and specifications.

The benefits and advantages of the present disclosure are now believed to have been amply illustrated in relation to the exemplary embodiments disclosed.

An embodiment of a power fuse is disclosed. The power fuse includes a housing, a first terminal assembly, a second terminal assembly, and a fuse element assembly. The housing has a first end and a second end. The first terminal assembly is fabricated from a zinc-aluminum alloy and coupled to the housing at the first end. The second terminal assembly is fabricated from the zinc-aluminum alloy and coupled to the housing at the second end. The fuse element assembly is positioned inside the housing and electrically connected between the first terminal assembly and the second terminal assembly. The first terminal assembly and the second terminal assembly each further include a copper plating entirely covering an exterior of the zinc-aluminum alloy.

Optionally, the first terminal assembly is a single piece and further includes a terminal and an end bell. The first terminal assembly further includes at least one filler hole. The first terminal assembly further includes a groove sized to receive an end of the fuse element assembly. The first terminal assembly includes a plurality of terminal injection gates. The power fuse is engineered to provide a voltage rating of 120 V or greater. The power fuse is engineered to provide a current rating of 600 A. The zinc-aluminum alloy includes approximately 4% of aluminum by mass and approximately 95% of zinc by mass.

An embodiment of a terminal assembly for a power fuse is provided. The terminal assembly includes an end bell and a terminal extending from the end bell. The terminal assembly is fabricated from a zinc-aluminum alloy, and the terminal assembly further includes a copper plating entirely covering an exterior of the zinc-aluminum alloy.

Optionally, the terminal assembly is a single piece. The terminal assembly further includes at least one filler hole. The terminal assembly further includes a groove on a side of the end bell opposite the terminal. The terminal assembly includes a plurality of terminal injection gates. The zinc-aluminum alloy includes approximately 4% of aluminum by mass and approximately 95% of zinc by mass.

An embodiment of a method of fabricating a terminal assembly for a power fuse is disclosed. The method includes providing a zinc-aluminum alloy into a die cavity, casting the terminal assembly as a single piece from the zinc-aluminum alloy, and plating the terminal assembly with copper.

Optionally, casting the terminal assembly further includes casting the terminal assembly to have an end bell and a terminal extending from the end bell. Casting the terminal assembly further includes casting the terminal assembly to have a groove on a side of the end bell opposite the terminal. Casting the terminal assembly further includes casting the terminal assembly to have at least one filler hole. Providing a zinc-aluminum alloy further includes providing the zinc-aluminum alloy through a plurality of injection gates. Providing a zinc-aluminum alloy further includes providing the zinc-aluminum alloy that includes approximately 4% of aluminum by mass and approximately 95% of zinc by mass.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from those described and depicted without departing from inventive concepts described. Also, in certain embodiments, certain components in the assemblies described may be omitted to accommodate particular types of fuses or the needs of particular installations, while still providing the needed performance and functionality of the fuses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power fuse comprising:

a housing having a first end and a second end;

a first terminal assembly fabricated from a zinc-aluminum alloy and coupled to the housing at the first end;

a second terminal assembly fabricated from the zinc-aluminum alloy and coupled to the housing at the second end; and a fuse element assembly positioned inside the housing and electrically connected between the first terminal assembly and the second terminal assembly, wherein the first terminal assembly and the second terminal assembly each further comprise a copper plating entirely covering an exterior of the zinc-aluminum alloy.

2. The power fuse of claim 1, wherein the first terminal assembly is a single piece and further comprises a terminal and an end bell.

3. The power fuse of claim 1, wherein the first terminal assembly further comprises at least one filler hole.

4. The power fuse of claim 1, wherein the first terminal assembly further comprises a groove sized to receive an end of the fuse element assembly.

5. The power fuse of claim 1, wherein the first terminal assembly includes a plurality of terminal injection gates.

6. The power fuse of claim 1, wherein the power fuse is engineered to provide a voltage rating of 120 V or greater.

7. The power fuse of claim 1, wherein the power fuse is engineered to provide a current rating of 600 A.

8. The power fuse of claim 1, wherein the zinc-aluminum alloy comprises approximately 4% of aluminum by mass and approximately 95% of zinc by mass.

9. A terminal assembly for a power fuse comprising:

an end bell; and a terminal extending from the end bell, wherein the terminal assembly is fabricated from a zinc-aluminum alloy, and the terminal assembly further comprises a copper plating entirely covering an exterior of the zinc-aluminum alloy.

10. The terminal assembly of claim 9, wherein the terminal assembly is a single piece.

11. The terminal assembly of claim 9, wherein the terminal assembly further comprises at least one filler hole.

12. The terminal assembly of claim 9, wherein the terminal assembly further comprises a groove on a side of the end bell opposite the terminal.

13. The terminal assembly of claim 9, wherein the terminal assembly includes a plurality of terminal injection gates.

14. The terminal assembly of claim 9, wherein the zinc-aluminum alloy comprises approximately 4% of aluminum by mass and approximately 95% of zinc by mass.

15. A method of fabricating a terminal assembly for a power fuse, comprising:

providing a zinc-aluminum alloy into a die cavity;

casting the terminal assembly as a single piece from the zinc-aluminum alloy; and plating an entire exterior of the terminal assembly with copper.

16. The method of claim 15, wherein casting the terminal assembly further comprises casting the terminal assembly to have an end bell and a terminal extending from the end bell.

17. The method of claim 16, wherein casting the terminal assembly further comprises casting the terminal assembly to have a groove on a side of the end bell opposite the terminal.

18. The method of claim 15, wherein casting the terminal assembly further comprises casting the terminal assembly to have at least one filler hole.

19. The method of claim 15, wherein providing a zinc-aluminum alloy further comprises providing the zinc-aluminum alloy through a plurality of injection gates.

20. The method of claim 15, wherein providing a zinc-aluminum alloy further comprises providing the zinc-aluminum alloy that includes approximately 4% of aluminum by mass and approximately 95% of zinc by mass.

21. The power fuse of claim 1, wherein each of the first terminal assembly and the second terminal assembly further comprises:

an end bell;

a terminal extending from the end bell; and a groove on a side of the end bell opposite the terminal.

* * * * *